United States Patent [19]
Arons et al.

[11] 4,404,154
[45] Sep. 13, 1983

[54] METHOD FOR PREPARING CORROSION-RESISTANT CERAMIC SHAPES

[76] Inventors: Richard M. Arons, Wheaton; Joseph T. Dusek, Downers Grove, both of Ill., granted to U.S. Department of Energy under the provisions of 42 U.S.C. 2182

[21] Appl. No.: 326,088

[22] Filed: Nov. 30, 1981

Related U.S. Application Data

[63] Continuation of Ser. No. 101,363, Dec. 7, 1979, abandoned.

[51] Int. Cl.³ .............................................. C04B 33/24
[52] U.S. Cl. ...................................... 264/62; 264/65; 264/86
[58] Field of Search ............................. 264/62, 65, 86; 501/153

[56] References Cited

FOREIGN PATENT DOCUMENTS 733053  4/1966  Canada .................................. 264/62

Primary Examiner—John A. Parrish
Attorney, Agent, or Firm—Sandra B. Weiss; James W. Weinberger; Richard G. Besha

[57] ABSTRACT

Ceramic shapes having impermeable tungsten coatings can be used for containing highly corrosive molten alloys and salts. The shapes are prepared by coating damp green ceramic shapes containing a small amount of yttria with a tungsten coating slip which has been adjusted to match the shrinkage rate of the green ceramic and which will fire to a theoretical density of at least 80% to provide a impermeable coating.

6 Claims, No Drawings

METHOD FOR PREPARING CORROSION-RESISTANT CERAMIC SHAPES

CONTRACTUAL ORIGIN OF THE INVENTION

The invention described herein was made in the course of, or under, a contract with the U.S. Department of Energy.

This is a continuation of application Ser. No. 101,363, filed Dec. 7, 1979 now abandoned.

BACKGROUND OF THE INVENTION

This invention relates to a method for making corrosion-resistant ceramic shapes. More specifically, this invention relates to a method for making corrosion-resistant ceramic shapes having a tungsten metal coating.

There is a need for suitable materials for use as containment vessels which are capable of withstanding the highly corrosive molten metals and salts, such as are used in pyrochemical methods for nuclear fuel reprocessing. These solutions, which include molten alloys such as molten magnesium, copper and uranium or molten salts such as magnesium chloride, sodium chloride and potassium chloride are all very corrosive and difficult to contain, particularly at reprocessing temperatures which may go as high as 700° to 850° C.

One of the few materials which is capable of withstanding the corrosive attack of molten metals and salts such as these, is tungsten. However, the use of tungsten in corrosion-resistant hardware for containment, piping, agitation or other purposes is severely limited by its poor fabricability. Material properties of tungsten include a high melting point, high ductile to brittle transition temperature, high hardness and low ductility, all of which make casting or hot working and machining of large or complex shapes of tungsten virtually impossible. The welding of tungsten is also generally precluded by poor strength in the highly recrystallized heat-affected zone, poor penetration of the base metal by the weld, thermal shock problems associated with heating and cooling in the brittle temperature region, and difficulties in stress relief after welding. Consequently, the use of tungsten is largely limited to components of relatively small size and simple geometry.

Ceramic materials such as alumina may be fabricated into larger and more complex shapes, such as tubing and crucibles, with higher reliability and lower cost than tungsten metal. However, for use in highly corrosive environments, ceramic components must have a suitable protective coating.

While the application of a tungsten metal coating on ceramic shapes by methods such as vapor deposition is possible, it is difficult to accomplish and expensive because it requires that the substrate be heated and maintained at a high temperature in order for the metal to adhere. Furthermore, tungsten coatings supplied in this manner have a unidirectional grain structure which invites problems of grain boundary attack by the corrosive substance which could rapidly penetrate through the coating and destroy the ceramic shape. In Tungsten Metallizing Alumina-Yttria Ceramics, LA-6705-MS (1977), by Cowan, R. E. and Stoddard, S. D. the metallization of alumina bodies by the addition of small amounts of yttria to the alumina before firing is described. The tungsten is applied, as a slurry of finely divided powder in a water vehicle containing glycerine and a commercial electrolyte, to the surface of the alumina shape and fired. Although the coating is suitable for the intended purpose, i.e. as a brazing medium for joining two or more shapes, it is discontinuous and porous and therefore, will not protect the ceramic substrate from a corrosive environment.

SUMMARY OF THE INVENTION

A method has been developed for preparing refractory ceramic shapes having an impermeable, metallic tungsten coating which are suitable for the containment of highly corrosive materials. By the method of the invention, corrosion-resistant ceramic shapes are made by preparing a ceramic slip consisting of a finely divided ceramic powder, 0.5 to 5.0 weight percent yttria powder and a suspending agent in a water vehicle, the particle size of the ceramic power being such that, a shape formed from the slip will fire to a density of at least 90% of theoretical and that the shape will have a predetermined shrinkage rate during firing, forming the slip into a green shape, and drying the green shape until it contains from about 5 to 12 weight percent moisture. A coating slip is then prepared consisting of finely divided tungsten powder and about 0.5 to 1.0 weight percent ammonium alginate as a suspending agent in a water vehicle, the particle size of the tungsten powder being such that the tungsten slip will have fire to a density of at least 80% of theoretical and will have a shrinkage rate during firing, which is about the same as the shrinkage rate of the ceramic slip. A coating of the tungsten slip is applied to the surface of the damp green ceramic shape to form a green composite, and the green composite is then heated under a vacuum or reducing atmosphere to sintering temperature for a period of sufficient to sinter and densify the green ceramic and the tungsten coating to form an impermeable tungsten layer on the surface of the ceramic shape.

It is therefore one object of the invention to provide a method for making corrosion-resistant ceramic shapes.

It is another object of the invention to provide a method for preparing ceramic shapes having a corrosion-resistant coating.

It is a still further object of the invention to provide a method for preparing ceramic shapes having a impermeable coating of tungsten metal.

It is still another object of the invention to provide a method for preparing corrosion-resistant shapes of alumina having an impermeable coating of tungsten metal.

Finally it is the object of the invention to provide a method for preparing corrosion-resistant alumina crucibles having an impermeable tungsten metal coating.

DETAILED DESCRIPTION OF THE PREFERRED EMBODIMENT

These and other objects of the invention may be met by preparing a ceramic casting slip, consisting of about 60–65 weight percent alumina powder, about 2 to 4 weight percent yttria powder and about 0.4 to 0.6 weight percent ammonium alginate as a suspending agent in a water vehicle, the slip being made basic with $NH_4OH$, the particle size of the alumina being such that, a shape cast of the ceramic slip will fire to a density of at least 90% of theoretical and that the shape will have a predetermined shrinkage rate during firing, casting the slip to form a green shape, removing the green shape from the mold and air drying the shape until it contains from about 8 to 10 weight percent moisture, preparing a tungsten coating slip, consisting of about 75 to 80 weight percent of finely divided tungsten powder and about 0.74 to 0.76 weight percent ammonium alginate as a suspending agent in a water vehicle, the slip being made basic with NH$_4$OH, the particle size of the tungsten powder being such that a coating of the slip will fire to a density of at least 85% of theoretical and will have a shrinkage rate which is about the same as the shrinkage rate of the coating slip, applying a coating of the tungsten slip, at least 20 μm thick on the surface of the damp green ceramic shape to form a green composite and heating the green composite under a vacuum or reducing atmosphere at a temperature and for a period of time sufficient to sinter and densify the ceramic and the tungsten thereby forming a dense corrosion-resistant ceramic shape having an outer layer of impermeable metallic tungsten.

While the process of the invention was specifically developed to provide a impermeable metallic tungsten coating on alumina shapes, the method will be suitable for providing impermeable metallic tungsten coatings on any refractory ceramic material from which a slip can be prepared which can be matched closely with the shrinkage rate of the tungsten slip. This is necessary in order to provide a coating which must be continuous and crack-free in order to prevent any penetration by a corrosive substance through the coating to the ceramic.

The ceramic slip must contain a small amount of yttria which acts not only as a sintering and densifying agent for the ceramic, but also by apparently forming a yttrogarnet compound at grain boundries to which the tungsten adheres. The amount of yttria will vary depending upon the particular ceramic material with which it is being used. When used with alumina, the amount of yttria may vary from about 0.5 to 5.0 weight percent, preferably 2 to 4 weight percent. The yttria powder should be in the same size range as the ceramic powder for good dispersal. Water has been found to provide the best vehicle for the slip although other liquids may be satisfactory. A suspending agent in the slip is necessary to provide a proper suspension, to act as a binder and lubricant and to adjust the slip set speed. Although the particular agent may vary with the ceramic material being used, ammonium alginate in an amount of about 0.4 to 0.6 weight percent has been found suitable for use with alumina. Other suspending agents such as glycerine may also be satisfactory. It is also important that the ceramic slip be maintained basic, preferably with NH$_4$OH when using ammonium alginate to prevent any settling out of suspended material.

The determination of particle size of the ceramic material in order to provide a slip which has a predetermined shrinkage rate and which will fire to a shape having a density of at least 90% of theoretical is dependent upon the particular ceramic being used and is well known in the art. For example, a slip containing about 44 weight percent of 8 μm and about 17.6 weight percent of 0.3 μm alumina powders in a water vehicle has a shrinkage of about 20% and will fire to a density of about 95% of theoretical density.

The green ceramic shapes may be prepared by any well-known means such as slip casting using a porous mold or by extrusion from a press. It is important that the green shapes, once formed, be allowed to dry until they contain from about 5 to 12% moisture, preferably 8 to 10% moisture, in order that the tungsten slip when applied will adhere properly and develop good green density. A shape containing too much moisture will sag and lose its shape, while insufficient moisture will cause the tungsten slip to dry too rapidly. This could result in cracking, poor densification or failure of the coating to adhere properly upon firing.

The tungsten coating is prepared in the same manner as the ceramic slip using a water vehicle. The particle size of the tungsten must be adjusted so that the shrinkage rate of the slip is within about 1%, preferably within about ½%, of the shrinkage rate of the ceramic slip. The particle size must also be such that the tungsten coating will fire to a density of at least 80%, preferably 85%, of theoretical in order to provide a coating which will contain no open or continuous porosity. Thus a slip of about 55 weight percent of 5.0 μm and 22 weight percent of 1.45 μm tungsten powder in a water vehicle was found to be satisfactory, having a shrinkage rate of about 20%, matching that of the casting slip, and firing to a density of about 90% of theoretical, forming an impermeable coating on the ceramic. A suspending agent is necessary to retard slip set speed and to serve as a lubricant and binder. It is also important that the suspending agent leave no ash upon firing the shape which might promote porosity in the coating. While a number of suspending agents may be satisfactory, the addition of about 0.5 to 1.0, preferably 0.75, weight percent ammonium alginate to the slip was found to provide satisfactory results. As with the ceramic slip, it is important that the tungsten slip be basic, preferably with ammonium hydroxide to prevent any settling out of suspended material.

The tungsten coating slip may be applied to the surface of the damp green shape by brush coating, slip casting on the internal surface of the shape or by air brushing to form the composite green shape. The coating should be at least 20 μm, preferably about 65 μm, thick in order to insure that the tungsten coating upon firing will be impermeable. Care should be taken that the coating is not too thick, i.e. over about 150 μm, in order to reduce the possibility of cracking during firing. The entire shape may be coated or only the surfaces which will be subjected to contact with a corrosive environment need be coated.

Firing of the composite green shape may take place in either a vacuum or in a reducing atmosphere and at a temperature and for a period of time sufficient to sinter and densify the shape and coating, since firing time is dependent upon firing temperature. Firing times of from 1 to 4 hours at about 1780° C. and about 19 hours at 1500° C. have been found to be satisfactory. The temperature, however, should not be higher than about 1800° C. in order to prevent volatilization or reduction of the alumina.

The following Examples are provided to illustrate the process of the invention and is not to be construed as limiting the scope of the invention which is defined by the appended claims.

EXAMPLE I

Small crucibles (7.6 cm high by 5.1 cm OD) of alumina—3 wt % yttria were prepared by slip casting according to the following procedure:

A casting slip was prepared from 480 g of 8 μm and 192 g of 0.3 μm alumina powders, 20 g of yttria powder, 390 ml of distilled water as a vehicle, 3.46 g of ammonium alginate as a suspending agent, and 2 ml of ammonium hydroxide for pH adjustment. This slip was ball milled for approximately 20 hours and then cast in a plaster-of-Paris mold to form a green crucible. The green crucible was removed from the mold and air dried until it contained about 9% moisture. The crucible was then coated with a slip prepared by mixing 536 g of 5.0 μm and 214 g of 1.45 μm pure tungsten powders prepared with 212 ml of distilled water, 5.6 g of ammonium alginate, and 1.75 ml of ammonium hydroxide, and ball milling the resulting slurry for 1½ hours. The tungsten slip was applied by slip casting on the interior of the crucible to form a layer about 65 μm in thickness. The composite was then fired in a vacuum by heating from 1000° to 1550° C. over 1.75 hours, heating from 1550° to about 1780° C. over 1 hour and soaking the crucible for 4 hours at 1780° C.$\neq$10° C., after which the furnace was cooled at an unknown rate. The firing produced a very dense ceramic crucible with an adherent, crack-free tungsten coating.

A SEM micrograph of a polished cross section of the substrate and coating showed that the coating was about 65 μm thick and in intimate contact with the substrate. The micrograph also showed a lack of any apparent interconnected porosity which suggests that the coating will be impermeable to liquid species and will thereby prevent attack of the substrate.

EXAMPLE II

Two tungsten metallized alumina-yttria crucibles were fabricated, as described in Example I, for corrosion testing in Zn and 50:50 by weight of $CuCl_2$-KCl at 800° C. One crucible was sectioned and a coupon was tested in the zinc and salt environment for 120 h. The observed weight change after testing and cleaning in water followed by dilute HCl was neglible and no degradation was observed. No attack of the tungsten layer was observed and no permeation of the zinc or salt into the coating took place. Post test integrity of the coating and the coating-substrate interface was excellent.

The second crucible was tested in its original configuration as a container for an agitated zinc and salt mixture at 800° C. for 250 h. The crucible was cooled and then rinsed in water to remove the salt layer and then sectioned without zinc removal. Macroscopic examination showed the crucible to be in excellent condition and no degradation in the form of cracking or spallation of the coating was observed. SEM examination showed no apparent surface degradation and no permeation of corrodants into the coating. A zinc x-ray map of the same are showed all zinc to be limited to the outer surface and the tungsten coating.

Coatings prepared in this manner have been shown to be thermally stable and shock-resistant and have survived heating rates of 85° C.-min$^{-1}$ with no substrate or coating degradation and no spallation of the coating.

Thus it has been shown that the method of this invention for the application of tungsten metal coatings to ceramic bodies containing yttria is a viable means of fabricating corrosion-resistant shapes. 9n The embodiments of the invention in which an exclusive property or privilege is claimed are defined as follows:

1. A method of preparing a refractory ceramic shape having an impermeable and corrosion-resistant metallic tungsten coating comprising:

preparing a ceramic casting slip consisting of a finely divided ceramic powder, 0.5 to 5.0 weight percent yttria powder and a suspending agent in a water vehicle, the particle size of the ceramic powder being such that a shape formed from the slip will fire to a density of at least 90% of theoretical and the shape will have a predetermined shrinkage rate during firing, forming a green ceramic shape from the slip, drying the green shape until it contains about 5 to 12 weight percent moisture, preparing a coating slip consisting of finely divided tungsten powder and about 0.5 to 1.0 weight percent ammonium alginate as a suspending agent in a water vehicle, the particle size of the tungsten powder being such that the tungsten slip will fire to a density of at least 80% of theoretical and will have a shrinkage rate during firing which is about the same as the shrinkage rate of the ceramic slip, applying a coating of the tungsten slip to the surface of the damp green ceramic shape to form a green composite shape, and firing the green composite shape in a vacuum or reducing atmosphere at a temperature and for a period of time sufficient to sinter and densify the green ceramic and the tungsten coating, thereby forming a dense ceramic shape having an impermeable and corrosion-resistant metallic tungsten coating.

2. The method of claim 1 wherein the ceramic material is alumina and the coating of tungsten slip is at least 20 μm thick.

3. The method of claim 1 wherein the ceramic slip contains from about 0.4 to 0.6 weight percent ammonium alginate as a suspending agent.

4. The method of claim 2 wherein the coating of tungsten slip on the surface of the damp green shape is from 60 to 150 μm in thickness.

5. The method of claim 3 wherein the ceramic slip contains from about 60 to 65 percent of alumina and the tungsten coating slip contains from about 75 to 80 weight percent tungsten powder.

6. The method of claim 4 wherein the green composite ceramic shape is fired to about 1800° C. for not less than one hour.

* * * * *